United States Patent
Watari

(10) Patent No.: US 10,033,809 B2
(45) Date of Patent: Jul. 24, 2018

(54) OUTPUT DATA PROVIDING SERVER, INFORMATION PROCESSING APPARATUS, INFORMATION PROCESSING SYSTEM, OUTPUT DATA PROVIDING METHOD, INFORMATION PROCESSING METHOD, AND DATA STRUCTURE OF CONTENT DATA

(71) Applicant: Sony Computer Entertainment Inc., Tokyo (JP)

(72) Inventor: Yasuhiro Watari, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 160 days.

(21) Appl. No.: 14/895,010

(22) PCT Filed: May 13, 2014

(86) PCT No.: PCT/JP2014/002528
§ 371 (c)(1),
(2) Date: Dec. 1, 2015

(87) PCT Pub. No.: WO2014/199562
PCT Pub. Date: Dec. 18, 2014

(65) Prior Publication Data
US 2016/0127464 A1 May 5, 2016

(30) Foreign Application Priority Data
Jun. 12, 2013 (JP) .................................. 2013-124180

(51) Int. Cl.
H04L 29/02 (2006.01)
H04L 29/08 (2006.01)
(Continued)

(52) U.S. Cl.
CPC ......... *H04L 67/1095* (2013.01); *G06Q 10/10* (2013.01); *H04L 67/42* (2013.01);
(Continued)

(58) Field of Classification Search
None
See application file for complete search history.

(56) References Cited

U.S. PATENT DOCUMENTS 7,996,878 B1* 8/2011 Basso .............. H04N 21/23412
715/723
2002/0162122 A1* 10/2002 Birks .................... H04N 7/088
725/136
(Continued)

FOREIGN PATENT DOCUMENTS

JP 2001290744 A 10/2001
JP 2004536681 A 12/2004
(Continued)

OTHER PUBLICATIONS

European Search Report for corresponding EP Application EP 14810178.5, 8 pages, dated Dec. 19, 2016.
(Continued)

*Primary Examiner* — Scott B Christensen
(74) *Attorney, Agent, or Firm* — Matthew B. Dernier, Esq.

(57) ABSTRACT

When a user executes an operation of requesting a client terminal for starting processing, a server starts information processing of specified contents, transmitting initial output data such as an initial screen and a sound to the client terminal. The client terminal outputs the initial data and, every time the user executes an indication input such as a command input, transmits the input information concerned to the server. The server executes information processing corresponding to the input information and generates output
(Continued)

data common to destination client terminals as basic output data and output data for each client terminal as individual output data. The client terminal decodes an image and sound data that are basic output data and synthesizes figures and sounds based on individual output data, thereby outputting the synthesized figures and sounds.

14 Claims, 10 Drawing Sheets

(51) Int. Cl.
  *G06Q 10/10* (2012.01)
  *H04L 29/06* (2006.01)
  *H04N 21/462* (2011.01)
  *H04N 21/81* (2011.01)

(52) U.S. Cl.
  CPC ..... *H04N 21/4622* (2013.01); *H04N 21/8106* (2013.01); *H04N 21/8146* (2013.01)

(56) References Cited

U.S. PATENT DOCUMENTS

| | | | |
|---|---|---|---|
| 2005/0044575 | A1 | 2/2005 | Der Kuyl |
| 2010/0122285 | A1 | 5/2010 | Begeja |
| 2010/0332587 | A1* | 12/2010 | Schwimer ......... G06F 17/30893 709/203 |
| 2011/0313972 | A1* | 12/2011 | Albouze ........... G06F 17/30575 707/624 |
| 2013/0104165 | A1* | 4/2013 | Kim ................. H04N 21/23614 725/32 |
| 2013/0162664 | A1* | 6/2013 | Peacock ................... G06T 1/60 345/543 |
| 2013/0346475 | A1* | 12/2013 | Jasperson ............... H04L 67/02 709/203 |

FOREIGN PATENT DOCUMENTS

| | | |
|---|---|---|
| JP | 2010020159 A | 1/2010 |
| JP | 2011165074 A | 8/2011 |
| JP | 2012085876 A | 5/2012 |
| WO | 03011411 A1 | 2/2003 |

OTHER PUBLICATIONS

Intenational Search Report for corresponding PCT Application No. PCT/JP2014/002528, 1 pg., dated Aug. 12, 2014.

International Preliminary Report on Patentability and Written Opinion for corresponding PCT Application No. PCT/JP2014/002528, 8 pgs., dated Dec. 23, 2015.

Office Action for corresponding JP Application JP 2013-124180, 15 pages, dated Jul. 11, 2017.

* cited by examiner

FIG.8

| ID | FIGURE DATA |
|---|---|
| Jack | Rectangle: [20, 20, 300, 30] |
| Mom | Rectangle: [20, 55, 300, 30] |
| Taro | Rectangle: [20, 90, 300, 30] |
| Doc | Rectangle: [20, 125, 300, 30] |
| ... | ... |

72a — ID column
72b — FIGURE DATA column

| ID | SOUND EFFECT ID |
|---|---|
| Jack | — |
| Mom | #06 |
| Taro | — |
| Doc | #02 |
| ... | ... |

76a — ID column
76b — SOUND EFFECT ID column

74

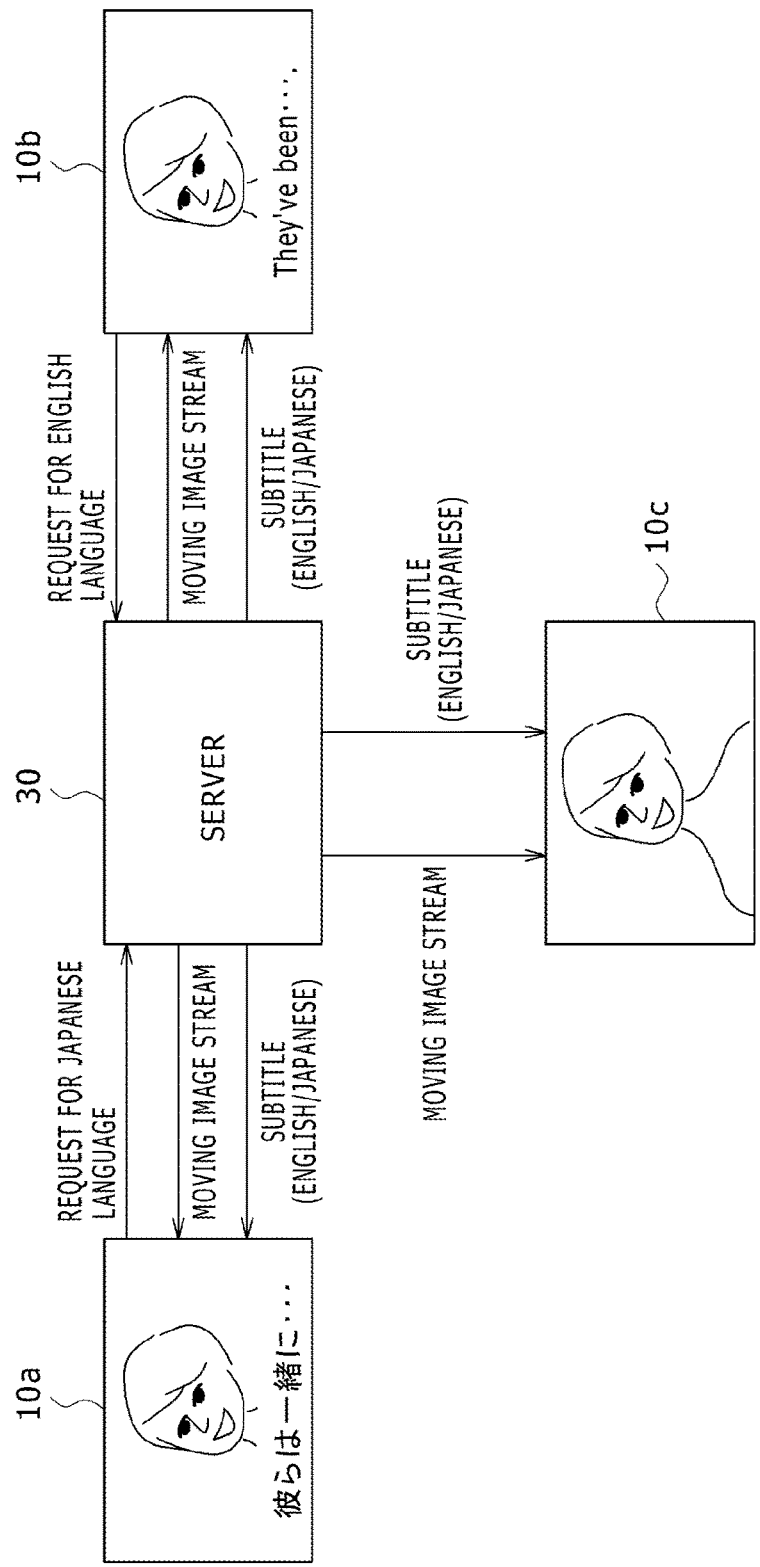

OUTPUT DATA PROVIDING SERVER, INFORMATION PROCESSING APPARATUS, INFORMATION PROCESSING SYSTEM, OUTPUT DATA PROVIDING METHOD, INFORMATION PROCESSING METHOD, AND DATA STRUCTURE OF CONTENT DATA

TECHNICAL FIELD

The present invention relates to a technology for providing information processing services by use of a network.

BACKGROUND ART

The recent development of information processing technologies and the recent improvement and enhancement in network technologies allow the realization of various types of information processing in cooperation with servers independently of the performance and use environment of such apparatuses operated by users as personal computers and portable terminals. For example, a technology is proposed in which the terminal operated by a user is separated from the information processing apparatus executing information processing accordingly so as to output high-level information also at a portable terminal or the like having a simple configuration (refer to PTL 1 for example). As with cloud computing, a technological trend is increasingly getting strong in which various services provided by servers are used through networks so as to realize high-level information processing and management of huge amounts of data independently of the environment in which the user is placed.

CITATION LIST

Patent Literature

[PTL 1] Japanese Patent Laid-Open No. 2010-20159

SUMMARY

Technical Problem

As described above, a technology in which the processing operations for a user are collectively executed by a server brings about not only an advantage that the processing load of the terminal operated by a user is mitigated but also an effect that the results of information processing and management data can be shared between two or more terminals and users. On the other hand, as the sharing and parallelization of information processing as described above are allowed, presented images, sounds, and other output data become stereotypical, thereby causing a problem that it becomes difficult to satisfy individual requirements of users.

The present invention has been made in view of such a problem. It is an object of the present invention to provide a technology in which the collective information processing by a server and the answering to individual requirements of users are satisfied at the same time without increasing the load of the processing.

Solution to Problem

A mode of the present invention relates to an output data providing server. The output data providing server is connected to a client terminal through a network so as to receive information related with a user operation executed on the client terminal to execute information processing and transmit output data obtained as a result of the information processing to a client terminal requesting the output data. The output data providing server includes: an input information reception block configured to obtain the information related with the user operation as input information; an information processing block configured to execute information processing on a basis of the input information; a basic output data generation block configured to generate, of output data obtained as a result of the information processing, basic output data independent of a destination client terminal; an individual output data generation block configured to generate, of the output data, individual output data to be outputted after being synthesized with the basic output data at a destination client terminal in association with each client terminal; and an output data transmission block configured to transmit the basic output data and the individual output data to a destination client terminal after associating the basic output data with the individual output data.

Another mode of the present invention relates to an information processing apparatus. The information processing apparatus is connected to a server through a network so as to receive output data obtained as a result of information processing executed on the server and output the output data. The information processing apparatus includes: a basic output data processing block configured, of the output data, to make outputtable basic output data generated independently of a receiving apparatus; an individual output data processing block configured, of the output data, to extract individual output data generated in association with own apparatus and synthesize the extracted individual output data with the outputtable basic output data with a necessary timing, thereby providing final output data; and an output block configured to output the final output data.

Still another mode of the present invention relates to an information processing system. The information processing system includes: a server connected with client terminals through a network so as to receive information related with a user operation executed on at least one of the client terminals to execute information processing; and client terminals configured to receive output data obtained as a result of the information processing and output the output data. The server includes: an input information reception block configured to obtain the information related with the user operation as input information; an information processing block configured to execute information processing on a basis of the input information; a basic output data generation block configured to generate, of output data obtained as a result of the information processing, basic output data independent of a destination client terminal; an individual output data generation block configured to generate, of the output data, individual output data to be outputted after being synthesized with the basic output data at a destination client terminal in association with each client terminal; and an output data transmission block configured to transmit the basic output data and the individual output data to a destination client terminal after associating the basic output data with the individual output data. The client terminal includes: a basic output data processing block configured to make the basic output data outputtable; an individual output data processing block configured to extract the individual output data generated in association with own apparatus and synthesize the extracted individual output data with the outputtable basic output data with a necessary timing, thereby providing final output data; and an output block configured to output the final output data.

Yet another mode of the present invention relates to an output data providing method. In the output data providing method, a server is connected to a client terminal through a network so as to receive information related with a user operation executed on the client terminal concerned, execute information processing, and transmit output data obtained as a result of the information processing to a requesting client terminal. The output data providing method includes: a step of obtaining the information related with the user operation as input information; a step of executing information processing on a basis of the input information; a step of generating, of output data obtained as a result of the information processing, basic output data independent of a destination client terminal; a step of generating, of the output data, individual output data to be outputted after being synthesized with the basic output data at a destination client terminal in association with each client terminal; and a step of transmitting the basic output data and the individual output data to a destination client terminal after associating the basic output data with the individual output data.

A different mode of the present invention relates to an information processing method. In the information processing method, an information processing apparatus is connected to a server through a network so as to receive output data obtained as a result of information processing executed on the server concerned and output the received output data. The information processing method includes: a step of, of the output data, making outputtable basic output data generated independently of a receiving apparatus; a step of, of the output data, extracting individual output data generated in association with own apparatus and synthesizing the extracted individual output data with the outputtable basic output data with a necessary timing, thereby providing final output data; and a step of outputting the final output data.

A still different mode of the present invention relates to a data structure of content data. The data structure of content data is generated as a result of information processing executed on a server on a basis of information related with a user operation executed on a client terminal connected through a network and is transmitted to be outputted to a data requesting client terminal. The data structure associates: basic output data commonly generated independently of destination client terminals; with individual output data generated for each client terminal, the individual output data being synthesized with the basic output data on a destination client terminal and outputted.

It should be noted that any arbitrary combinations of the components described above and any conversions in the expression of the present invention between method, apparatus, system, computer program and so on are also valid as modes of the present invention.

Advantageous Effect of Invention

According to the present invention, sharing of information processing with needs of each user added can be realized with ease.

BRIEF DESCRIPTION OF DRAWINGS

FIG. 8 is a diagram illustrating an example of a data structure in the case where individual output data is generated in common to all client terminals in the present embodiment.

FIG. 9 is a diagram illustrating another example of the data structure in the case where individual output data is generated in common to all client terminals in the present embodiment.

FIG. 11 is a diagram illustrating an example of data that is exchanged between the client terminal and the server on the basis of the processing procedure shown in FIG. 10 and an example of a display screen on each client terminal.

DESCRIPTION OF EMBODIMENT

Figure 1:
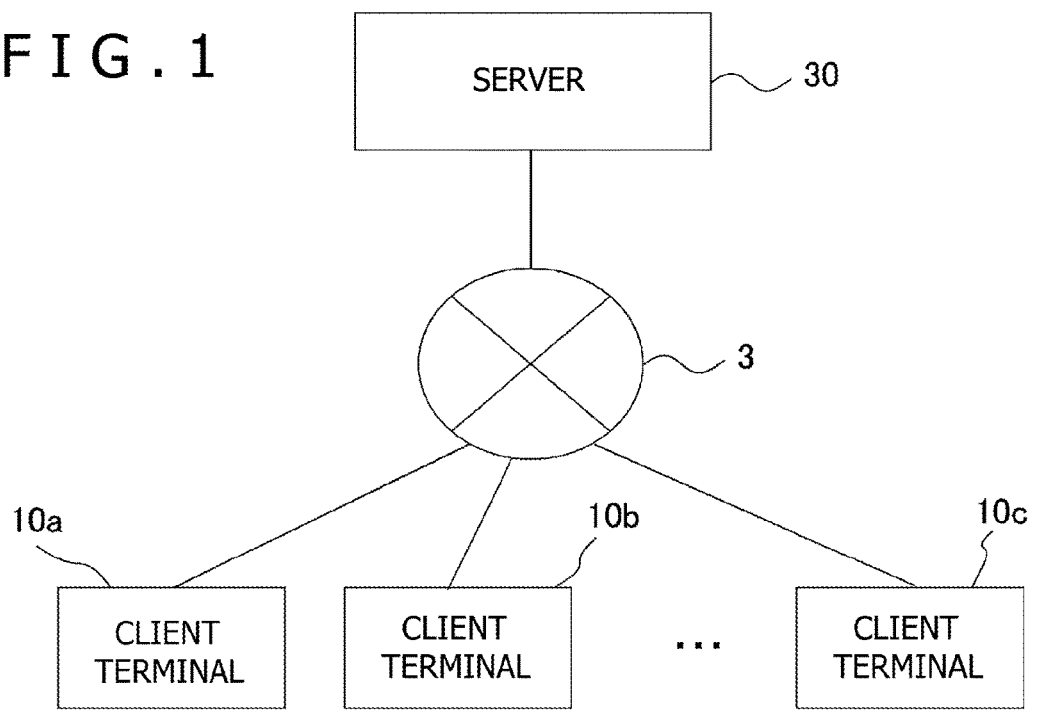
FIG. 1 is a diagram illustrating a configuration of an information processing system applicable to the present embodiment.

Referring to FIG. 1, there is shown a configuration of an information processing system in the present embodiment. In an information processing system 1, client terminals 10a, 10b, and 10c are configured to be connectable with a server 30 through a network 3, thereby executing exchange of data with the server 30. In response to requests from the client terminals 10a, 10b, and 10c, the server 30 executes information processing and transmits output data generated as a result of the information processing to the client terminals 10a, 10b, and 10c. The client terminals 10a, 10b, and 10c are connected to the network 3 in a wired or wireless manner. For the technique of connection between the client terminals 10a, 10b, and 10c with the server 30, the request for information processing, and the procedure related with output data exchange, generally known techniques are applicable.

The client terminals 10a, 10b, and 10c are apparatuses each of which is operated by a user, transmitting an operation done by the user to the server 30 as input information, requesting for corresponding information processing, and outputting output data generated as a result of the information processing executed by the server 30 in the form of images and sounds. The client terminals 10a, 10b, and 10c may be any of general apparatuses and terminals, such as a tablet computer, a mobile phone, a mobile terminal, and a personal computer. It should be noted that the number of client terminals 10a, 10b, and 10c and server 30 connected to the network 3 is not especially limited. In what follows, the client terminals 10a, 10b, and 10c are also generically referred to as the client terminal 10.

The information processing that the client terminal 10 requests the server 30 to execute is not especially limited; in what follows, a mode in which a game is realized will be described. To be more specific, the server 30 starts up a game specified by the user at the client terminal 10 and makes the game progress in accordance with an operation done by the user at the client terminal 10. Then, the server 30 successively transmits output data such as game image and sound accordingly generated to the client terminal 10. The client terminal 10 sequentially converts the output data transmitted from the server 30, by e.g. decoding, into an output-enabled form, thereby outputting the converted data as images and sounds.

Consequently, a game screen and a game sound corresponding to a user operation are outputted from the client terminal 10. This configuration can also be said that the server 30 provides a service of transmitting data of a moving image whose contents are changed in response to a user operation as content data. However, the information processing to be executed in the server 30 may be any one of general information processing operations such as document creation, image drawing, and communication tools such as electronic bulletin board, in addition to games. Further, the output data may be any one of image data only, sound data only, and both image data and sound data, which is appropriately determined depending on the contents of the information processing to be executed.

In addition, the server 30 transmits the same output data to two or more client terminals 10, thereby allowing two or more users to share the output data. For example, if the information processing to be executed is a network game in which two or more users can participate, then the server 30 successively receives information related with an operation done by each user from the two or more client terminals 10 and reflects the received information onto the progression of the game. Next, the server 30 transmits the generated game output data to all of the client terminals 10, thereby realizing a match game.

The destinations of the transmission of output data may include the client terminals 10 of other users simply wanting to watch the game in addition to the client terminals 10 of users participating in the game. As described above, in the present embodiment, it is a basic configuration that the operation information received by the client terminals 10 from users is successively received by the server 30 regardless of the number of client terminals 10, output data is generated realtime, the generated output data is transmitted to the client terminals 10, and the client terminals 10 successively execute the output in accordance with operations. However, in sharing output data, a time gap may be given such that output data once stored in a storage apparatus of the server 30 is later transmitted upon request from client terminals 10 unless the same output data is transmitted simultaneously to two or more client terminals 10.

In the mode described above, the server 30 generates different individual pieces of output data and transmits the output data thus generated to different client terminals 10 in addition to the output data that is common to all client terminals 10. Each client terminal 10 synthesizes these pieces of output data and output the synthesized data. Thus, although the processing is executed collectively at the server 30, the data output corresponding to an individual request of each user is allowed.

For example, during the execution of a game in which two or more users participate, the position of an object and a character operated by each user and the timing of sound effects to be generated when these object and character move are information that is independent for each user. Therefore, information for drawing simple figures indicative of the positions and information about the timing of generating sound effects are generated for each client terminal 10 to which output data is transmitted. This configuration facilitates the recognition of an operation target of each user himself/herself and, at the same time, prevents the irrelevant occurrence of sound effects caused by operations of other users. In what follows, the basic output data common to two or more client terminals 10 is referred to as "basic output data" and the output data different between the client terminals to which output data is transmitted is referred to as "individual output data."

It should be noted that the figures and sounds that are generated and outputted as individual output data are not limited to the positions of objects themselves operated by the user and sound effects. In other words, an image and a sound to be displayed and sounded separately from other users may be determined in accordance with the contents of the game, such as those which facilitate the recognition of each operation and those which give the sense of presence for each operation. For example, the individual output data may include environmental sound or BGM of a world in which objects exist, the position and sound of an enemy, or, in some cases, positions and sounds of objects operated by other users if such data has some relevance to the operation of the user himself/herself.

Figure 2:
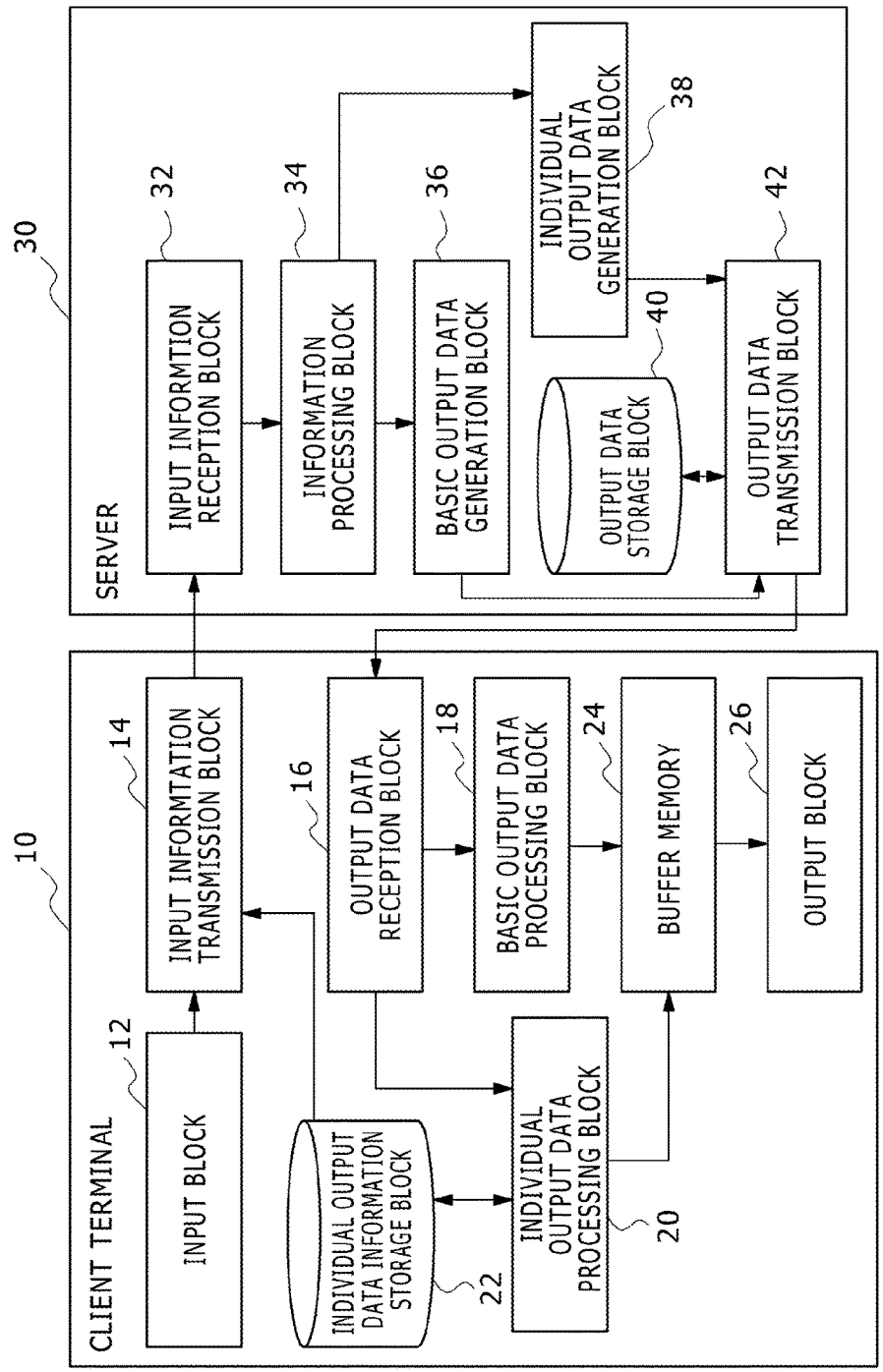
FIG. 2 is a diagram illustrating configurations of a client terminal and a server in the present embodiment in more detail.

Referring to FIG. 2, there is shown the configuration of the client terminal 10 and the server 30 in more detail. The client terminal 10 has an input block 12 configured to accept a user operation, an input information transmission block 14 configured to transmit the accepted operation contents to the server 30 as input information, an output data reception block 16 configured to receive output data transmitted from the server 30, a basic output data processing block 18 configured to process basic output data among the output data into an output-enabled form, an individual output data processing block 20 configured to process individual output data into an output-enabled form, an individual output data information storage block 22 configured to store information necessary for processing individual output data, a buffer memory 24 configured to temporarily store basic output data and individual output data, and an output block 26 configured to output output data as at least one of image and sound.

The server 30 has an input information reception block 32 configured to receive information input by the user from the client terminal 10, an information processing block 34 configured to execute information processing requested by the client terminal 10, a basic output data generation block 36 configured to generate basic output data as a result of the information processing, an individual output data generation block 38 configured to generate individual output data, an output data storage block 40 configured to store basic output data and individual output data as required, and an output data transmission block 42 configured to integrate basic output data and individual output data and transmit the resultant data to the client terminal 10 as output data.

In FIG. 2, the elements described as functional blocks for executing various processing operations can be configured by a CPU (Central Processing Unit), a memory, and other LSIs in a hardware approach and, in a software approach, realized by programs and so on stored in a recording medium or a storage apparatus and loaded into a memory. Therefore, it is understood by those skilled in the art that these functional blocks can be realized in various manners; by hardware only, software only, or combinations of both, and therefore not limited to any one thereof.

The input block 12 of the client terminal 10 provides input means for a user to specify information processing for requesting the server 30, execute operations for the information processing, and enter commands for the information processing and is realized by any of general inputting apparatuses such as buttons, a touch panel, a keyboard, a mouse, and a joy stick. The input information transmission block 14 establishes communication with the server 30 through a general technique, generates a signal indicative of the contents of each operation done by the user on the input block 12 as input information, and transmits the input information to the server 30.

The input information transmission block 14 also reads identification information and the like of the own client terminal 10 stored in the individual output data information storage block 22 and transmits the identification information to the server 30. The identification information is information for identifying a target that the server 30 generates individual output data and to which the server 30 transmits the generated individual output data; for example, this information may be any of pieces of information that are uniquely given to the client terminal 10 or the user operating the client terminal 10, such as IP address, MAC address, and user login name.

The input information reception block 32 of the server receives the identification information and the input information transmitted from the client terminal 10. The information processing block 34 of the server 30 executes information processing such as a game in accordance with the input information received by the input information reception block 32. As described above, the input information is successively transmitted from one or more client terminals 10 and the information processing block 34 accordingly makes the information processing progress in realtime. Exchange of signals between the input information transmission block 14 of the client terminal 10 and the input information reception block 32 of the server 30 is executed on the basis of a predetermined protocol, and the information processing block 34 executes the information processing on the basis of the input signal from the input information reception block 32 as if the information processing were executed inside the client terminal 10.

Description of a specific protocol and processing of an input signal itself is skipped because a general emulation technology can be applied. However, the information processing block 34 in the present embodiment further extracts information related with the position of a corresponding object and the generation timing of sound effects from the results of the information processing for each piece of identification information transmitted from each client terminal 10.

The basic output data generation block 36 of the server 30 generates basic output data among the data to be outputted as a result of the information processing in the information processing block 34. This may be general processing such as drawing computer graphics including an object acting in accordance with a user operation and reading data of background music corresponding to the drawn graphics from a storage apparatus not shown. If the information processing is a game in which an object moves, then the basic output data generation block 36 draws frames of a moving image at a predetermined time interval in accordance with the game progression processing by the information processing block 34.

The individual output data generation block 38 generates individual output data corresponding to the client terminal 10 of transmission destination. Hence, the individual output data generation block 38 acquires necessary information such as the position of an object and the generation timing of sound effects from the information processing block 34 in association with each piece of identification information of the client terminal 10. If the basic output data generation block 36 successively draws frames of a moving image, then the information processing block 34 supplies the necessary information to the individual output data generation block 38 by explicitly showing the temporal correlation between basic output data and individual output data.

For example, the information related with the position of an object is supplied such that a frame number of a moving image is associated with positional coordinates of the object. For the information related with the generation timing of sound effects, the frame number of a moving image to be displayed with that timing is supplied. It should be noted that, during such a period in which individual output data need not be updated as the object is in a stopped state, the generation processing may be skipped. It should also be noted that the figures and sounds that are outputted as individual output data are not limited to the figures and the sound effects that are representative of the position of the object. However, the simpler the figure and sound, the smaller the processing load of the client terminal 10, thereby enhancing the multiplier effect with the approximate completion of the generation processing of output data at the side of the server 30. The individual output data generation block 38 associates the generated individual output data with the identification information of the corresponding client terminal 10.

The output data transmission block 42 integrates the basic output data generated by the basic output data generation block 36 with the individual output data generated by the individual output data generation block 38 and transmits the integrated data to the client terminal 10. If the basic output data is moving image data, then the output data transmission block 42 integrates output data in accordance with the information from the individual output data generation block 38 such that the temporal correlation between the basic output data and the individual output data will be clear. For example, if the moving image data is stream-transferred, the correlation will be clear by transmitting the individual output data in synchronization with corresponding frames. It should be noted that, in a mode where individual output data is not related with the time axis of basic output data such as drawing figures at the same position, the individual output data may be attached only to the head of the basic output data, for example.

The timing with which to transmit individual output data in the mode where basic output data is stream-transferred as described above may be set in a variety of manners in accordance with the contents of information processing executed by the information processing block 34 and subjects represented by the individual output data. On the other hand, in the case of information processing in which an operation is executed with a temporal interval to a certain degree and output data is updated as a still image only in accordance with this operation, then the output data may be transmitted every time the operation is executed. In this case, basic output data and individual output data to be updated in accordance with the basic output data may be transmitted as one file.

It should be noted that, for individual output data, only that corresponding to the client terminal 10 of the transmission destination may be transmitted or information in which the identification information of each client terminal 10 is associated with individual output data may be commonly transmitted to all client terminals 10. In transmission, the output data transmission block 42 compressively encodes image data and sound data included in the output data by a general method. Also, the output data transmission block 42 stores the integrated output data in the output data storage block 40. Then, if a game situation is checked later by a player or if another user watches a game with a delayed timing, the output data transmission block 42 reads the data concerned from the output data storage block 40 as required and transmits the read data to the client terminal 10. However, if such a function is not realized, the output data storage block 40 need not be arranged.

The output data reception block 16 of the client terminal 10 receives the output data transmitted from the output data transmission block 42. The basic output data processing block 18 decodes and decompresses the basic output data in the output data received by the output data reception block 16 to restore the original image data and sound data. These pieces of data are stored in the buffer memory 24. The individual output data processing block 20 identifies figures and sounds to be synthesized with the basic output data on the basis of the individual output data in the output data, thereby synthesizing the identified figures and sounds with the images and sounds of the basic output data stored in the buffer memory 24.

If the individual output data is data in which the identification information is associated with the individual output data and common to the client terminals, then the individual output data processing block 20 reads the own identification information held by the individual output data information storage block 22 and extracts the corresponding individual output data. It is also practicable that the individual output data information storage block 22 may store information in which such attributes of the figures and sounds to be synthesized as individual output data as types of figures, colors, and types of sounds are associated with identification numbers thereof in advance and the identification numbers may be specified in the individual output data. In this case, the individual output data processing block 20 searches the individual output data information storage block 22 on the basis of the identification number specified in the individual output data and synthesizes the figures and sounds in accordance with the results of the search.

It should be noted that the individual output data processing block 20 may switch whether or not to execute the integration processing depending on the user or setting in the information processing. If the integration processing is not executed, only the basic output data is outputted. The output block 26 outputs the output data stored in the buffer memory 24 as image and sound. Therefore, the output block 26 is realized by a general display configured to display images such as a liquid crystal display, an organic EL display, or a plasma display, a sound output device configured to output an audio signal as sound such as a loudspeaker, an earphone, or a headphone, and a controller configured to control these devices.

Figure 3:
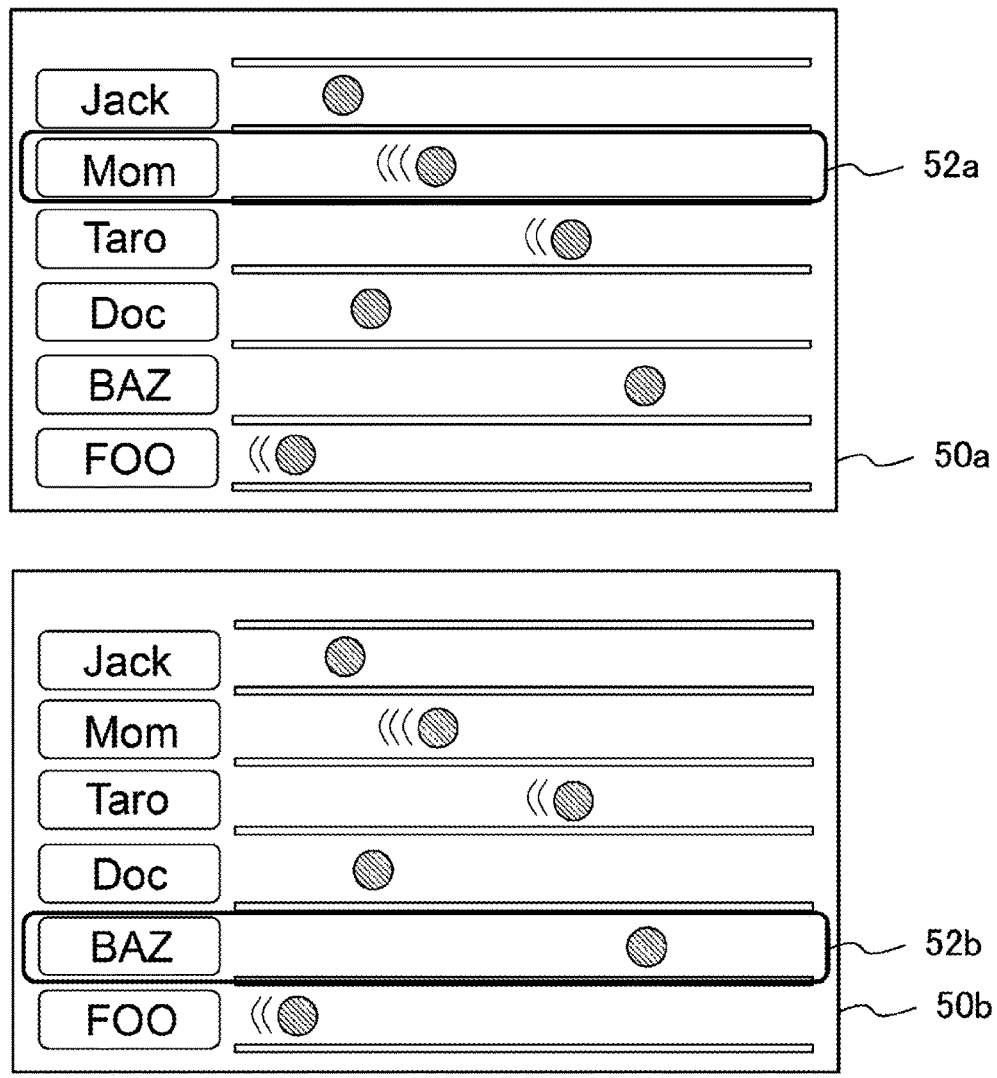
FIG. 3 is a diagram illustrating an example of a screen that is displayed on an output block of a user terminal in the present embodiment.

Referring to FIG. 3, there is shown an example of a screen that is displayed on the output block 26 of the client terminal 10; an upper screen 50*a* is displayed on a certain client terminal 10*a* while a lower screen 50*b* is displayed on another client terminal 10*b*. In this example, a game is supposed that six users having nicknames "Jack," "Mom," "Taro," "Doc," "BAZ," and "FOO" participate, operate the respective balls on the respective lanes of the participants in accordance with a certain rule to move the balls to the right side of the screen, and compete in speed. It is assumed here that the screen 50*a* be the client terminal 10*a* operated by the user nicknamed "Mom" and the screen 50*b* be a screen of the client terminal 10*b* operated by the user nicknamed "BAZ."

As illustrated, because the game screen itself including nicknames, lane sequence, balls, and so on may be common regardless of the users, the game screen is generated as basic output data. On the other hand, if a rectangle 52*a* enclosing only the lane of "Mom" in the screen 50*a* and a rectangle 52*b* enclosing only the lane of "BAZ" in the screen 50*b* are drawn as illustrated, then it becomes easy for each user to recognize the own lane. Therefore, these rectangles are generated as individual output data and synthesized with the game screen. In the case of the manner shown in the figure, each rectangle that is drawn on the basis of the individual output data is fixed regardless of the progression of the game, so that the server 30 may transmit the individual output data only once at the time when lane allocation is determined at the start of the game. However, if the change of lane layout is permitted halfway through the game owing to the increase or decrease in the number of participants for example, the individual output data is transmitted every time layout change occurs.

Figure 4:
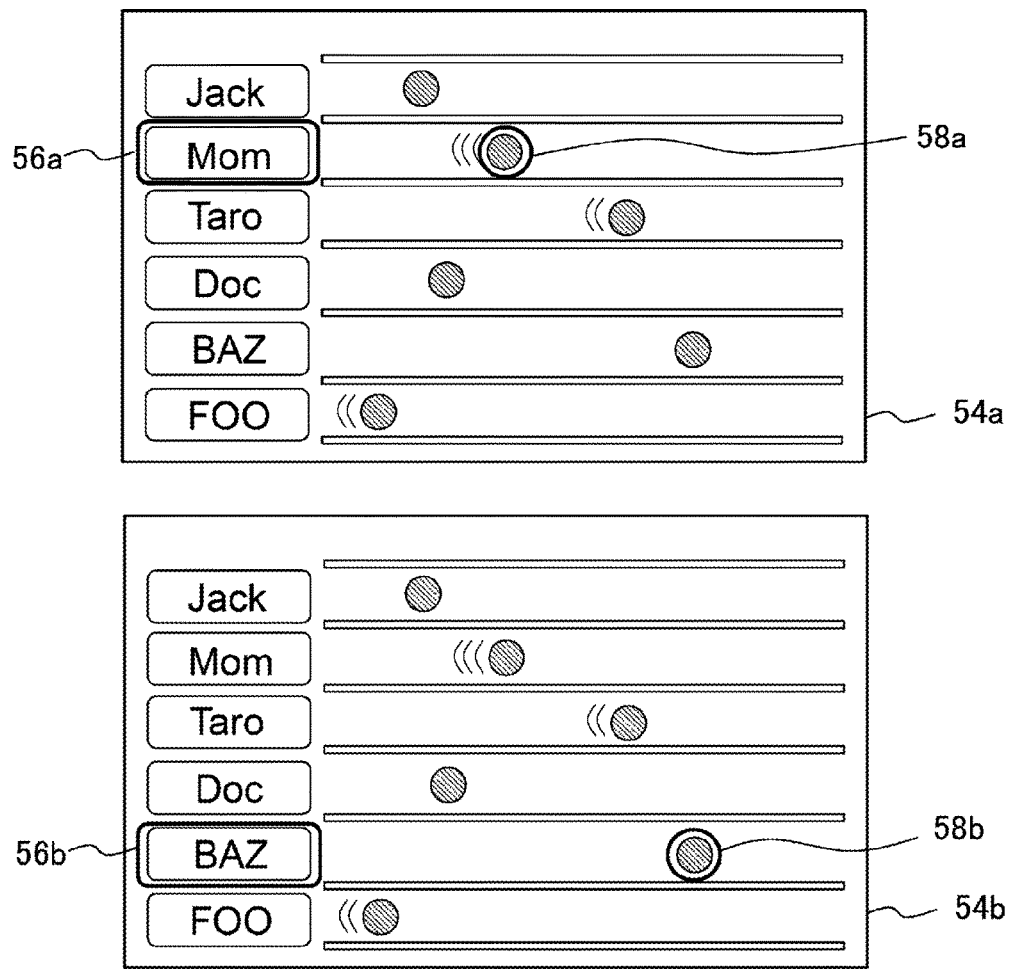
FIG. 4 is a diagram illustrating another example of the screen that is displayed on the output block of the user terminal in the present embodiment.

FIG. 4 shows another example of the screen displayed on the client terminal 10 in a game similar to that shown in FIG. 3. As with FIG. 3, an upper screen 54*a* is a screen of the client terminal 10*a* operated by the user nicknamed "Mom" and a lower screen 54*b* is a screen of the client terminal 10*b* operated by the user nicknamed "BAZ." In this example, these nicknames are enclosed by a rectangle 56*a* and a rectangle 56*b*, respectively, and the balls operated by these users are enclosed by a circle 58*a* and a circle 58*b*, respectively, on the basis of individual output data.

In this case, the rectangles 56*a* and 56*b* enclosing the nicknames are fixed regardless of the progression of the game, so that the individual output data for drawing these rectangles may be transmitted only at the start of the game. On the other hand, the circles 58*a* and 58*b* enclosing the balls as operation targets need to be moved as the balls move, so that, in a period in which the balls are moving, the individual output data is transmitted in association with each frame of a moving image that is basic output data. Adding figures to such moving objects themselves as the circle 58*a* and circle 58*b* facilitates each user to make distinction of the own operation target from another. This is especially effective in the case of game images where many objects move in arbitrary directions.

Figure 5:
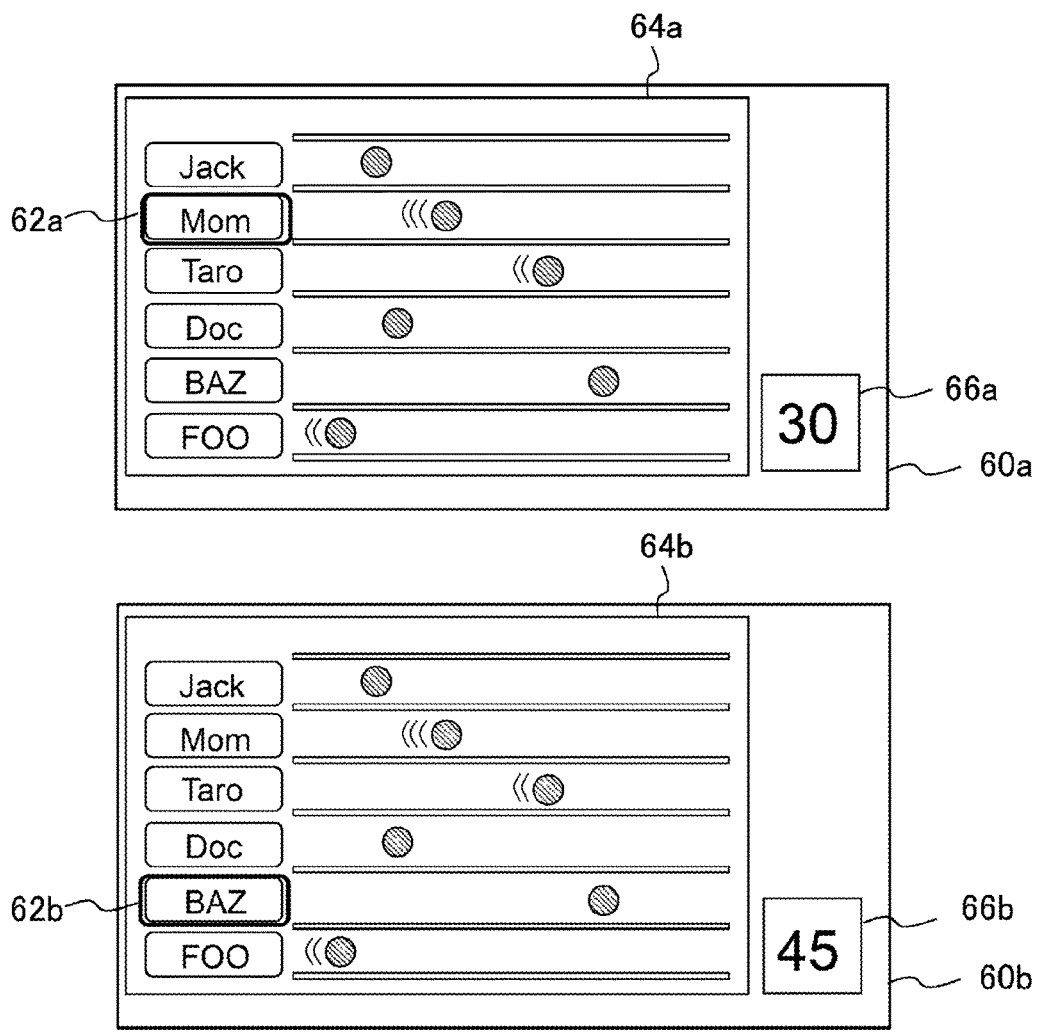
FIG. 5 is a diagram illustrating still another example of the screen that is displayed on the output block of the user terminal in the present embodiment.

FIG. 5 illustrates still another example of the screen displayed on the client terminal 10 in a game similar to those shown in FIG. 3 and FIG. 4. As with FIG. 3 and FIG. 4, an upper screen 60*a* is a screen of the client terminal 10*a* operated by the user nicknamed "Mom" and a lower screen 60*b* is a screen of the client terminal 10*b* operated by the user nicknamed "BAZ," these nicknames being enclosed by a rectangle 62*a* and a rectangle 62*b*, respectively, based on individual output data. On the other hand, in this example, images 64*a* and 64*b* of a game itself that are basic output data are displayed in a size smaller than that of the screens 60*a* and 60*b* of the client terminals, thereby providing a margin at the right side of each screen. At lower portions of these margins, scores 66*a* and 66*b* of the users are displayed.

The server 30 transmits the layout of the entire screen, the character font and size of the scores 66*a* and 66*b*, and score initial values as basic output data to the client terminals 10 in advance at the time of starting the game for example. Further, the server 30 also transmits the individual output data for drawing the rectangles 62*a* and 62*b*. Next, after the starting of the game, the server 30 continues the transmission of the images 64*a* and 64*b* of the game itself as the basic output data and, at the same time, transmits values of the user scores as the individual output data every time the user scores are updated.

Thus, objects to be drawn on the basis of individual output data may be characters and numerals in addition to figures. In the case of figures, the shape thereof may be a polygon, a line, a curve, and a symbol like an arrow in addition to a rectangle and a circle. Further, simple image processing may be executed such as changing color information including brightness and transparency and shading on a specified area. In drawing a figure or a character, it may be superimposed on the image of basic output data or drawn in another area like the scores shown in FIG. 5, depending on the purpose thereof. In adding sound, sound effects may only be generated with a timing specified by individual output data as described above or some sound processing may be executed with a specified timing on music being outputted as basic output data. In any case, individual output data is configured to generate a change allowing each user to identify own operation, a movement or a display related with the user himself/herself, and the like from those of other users in a visual manner, an audible manner or both thereof.

Figure 6:
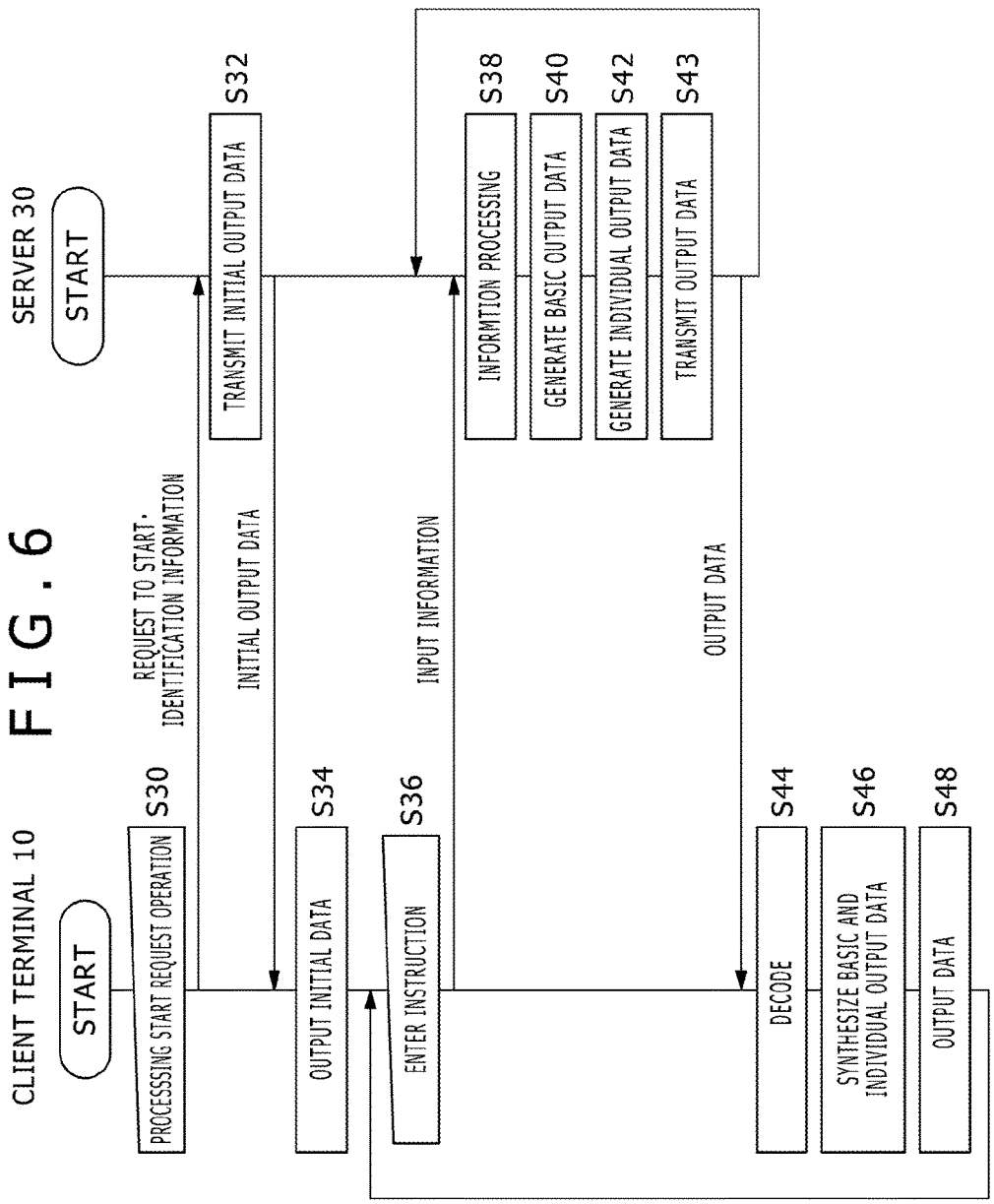
FIG. 6 is a flowchart indicative of a processing procedure for outputting data to the client terminal operated by a user in the present embodiment.

The following describes operations of the client terminal 10 and the server 30. Referring to FIG. 6, there is shown a flowchart indicative of a processing procedure for outputting data to a client terminal operated by a user in the present embodiment. In the figure, a processing procedure for one client terminal 10 and the server 30, but two or more client terminals 10 may be simultaneously connected to the server 30 as described above. In this case, the two or more client terminals execute processing in the same manner. The processing operations such as generation, transmission, and output of data are each indicated as one step; however, the processing operations may have a time width depending on the contents of processing. In this case, the processing operations appropriately progress in parallel. This holds true with a flowchart shown in FIG. 10 to be described later.

First, a user specifies the contents of processing such as the specification of a game name to the input block 12 of the client terminal 10 and then executes an operation of requesting the input block 12 for starting the processing (S30). Then, the input information transmission block 14 generates a corresponding processing start request signal and transmits the generated signal to the server 30 along with the identification information of the client terminal 10. When the input information reception block 32 of the server 30 receives the processing start request signal and the identification information, the information processing block 34 starts the information processing of the specified contents such as starting a game program. Next, initial output data such as an initial screen and sound is generated, and the output data transmission block 42 appropriately compressively encodes the initial output data and transmits the resultant data to the client terminal 10 (S32).

The data to be transmitted here may be basic output data only or include both basic output data and individual output data depending on the contents of processing and the design. In the former, the basic output data generation block 36 generates basic output data. In the latter, the individual output data generation block 38 additionally generates individual output data. In the case where the screen as shown in FIG. 3 for example is the initial screen, the basic output data generation block 36 generates the initial state of a game screen and the individual output data generation block 38 generates the information related with the rectangles 52a and 52b as individual output data upon determination of lane arrangement and allocation to each user.

When the output data reception block 16 of the client terminal 10 receives the initial output data, the basic output data processing block 18 decodes the basic output data in the received initial output data and the output block 26 outputs the decoded basic output data, upon which the initial screen and sound are outputted from the client terminal 10 (S34). If individual output data is included in the initial output data, then the individual output data processing block 20 interprets the individual output data to synthesize the interpreted data on the output data. It should be noted that, if the initial output data is data having a temporal width such as a moving image and music, then the transmission processing in S32 may be stream transfer. In this case, the client terminal 10 sequentially processes and outputs the received data.

When the user enters an instruction in the input block such as a command input while watching the initial screen displayed in the above-described manner, the input information transmission block 14 transmits the entered input information to the server 30 every time an instruction is entered (S36). When the input information reception block 32 of the server 30 receives this information, the information processing block 34 executes corresponding information processing (S38). It should be noted that, if the user of the client terminal 10 is a game watcher or the like and requests only output results, the processing in S36 is skipped for that client terminal 10.

The basic output data generation block 36 of the server 30 generates the data of image and sound that are results of the information processing as basic output data (S40). The individual output data generation block 38 generates individual output data in correspondence with each client terminal 10 with a necessary timing (S42). In a period during which individual output data is not updated, the processing in S42 can be skipped. Next, the output data transmission block 42 appropriately compressively encodes the basic output data and the individual output data for integration and transmits the integrated data to the client terminal 10 (S43).

Of the transmitted output data, the output data reception block 16 of the client terminal 10 supplies the basic output data to the basic output data processing block 18 and the individual output data to the individual output data processing block 20. The basic output data processing block 18 decodes the data of image and sound that are basic output data and stores the decoded data into the buffer memory 24 (S44). The individual output data processing block 20 synthesizes the figure and sound based on the individual output data on the image and sound stored as described above (S46). If the basic output data has a temporal width such as a moving image, then, for the drawing of figures for example, a same figure is synthesized on each image frame on the basis of the most recently transmitted individual output data. For the attachment of sound effects, synchronization is taken such that sound effects are generated at the point of time when image frames associated as generation timing are displayed. Here, if music is included in the basic output data, sound effects are synthesized on the music.

Then, the output block 26 displays an image stored in the buffer memory 24 onto the display, outputting sound from a speaker or the like (S48). Repeating the processing operations in S36 through S48 appropriately updates the image and sound of a game or the like based on the basic output data and the figures and sound based on the individual output data, thereby realizing a mode in which the information processing progresses.

Figure 7:
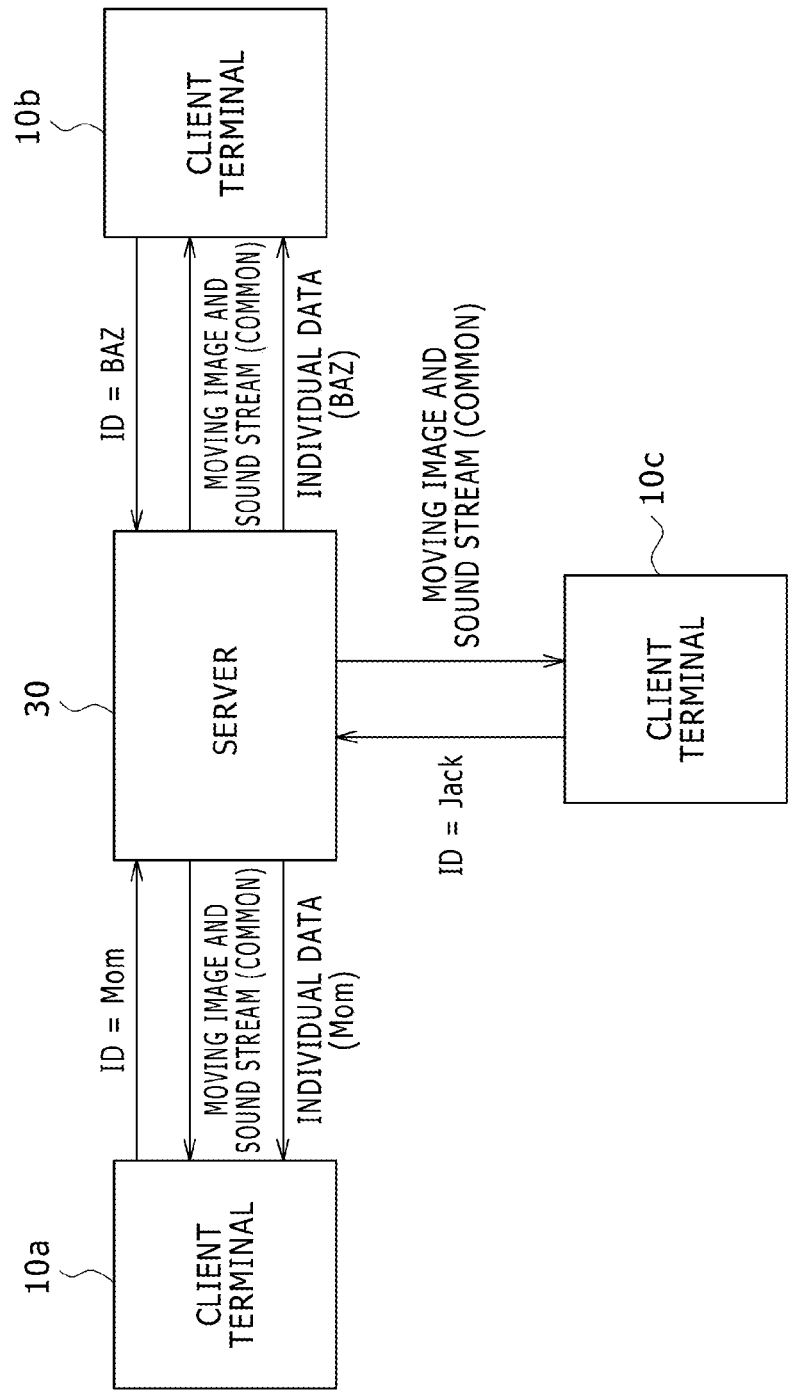
FIG. 7 is a diagram illustrating an example of data that is exchanged between the client terminal and the server by following the processing procedure shown in FIG. 6.

FIG. 7 illustrates an example of data that is exchanged between the client terminal 10 and the server 30 by the processing procedure shown in FIG. 6. In this example, three users participate in or watch a same game, so that the respective client terminals 10a, 10b, and 10c are connected to the server 30. Suppose that the login names of the users of the client terminals 10a, 10b, and 10c are "Mom," "BAZ," and "Jack," respectively, then the login names are transmitted from the client terminals to the server 30 as identification information upon starting of the game. In the figure, this transmission processing is shown with notations "ID=Mom," "ID=BAZ," and "ID=Jack" and arrows. It should be noted however that the identification information may be information for identifying the terminal itself as described above.

Then, the server 30 transmits the basic output data such as a game screen to the client terminals 10a, 10b, and 10c. In the example shown in FIG. 7, stream transfer of data such as a moving image and sound is indicated as a notation "moving image and sound stream (common)" and arrows. Further, the server 30 transmits individual output data for each client terminal as required. In the example shown in the figure, transmission of figures and sound data corresponding to login names "Mom" and "BAZ" to the client terminals 10a and 10b is indicated by notations "individual data (Mom)" and "individual data (BAZ)" and arrows.

On the other hand, individual output data corresponding to the login name "Jack" is not transmitted to the client terminal 10c. Thus, individual output data is data that can be controlled for each client terminal, so that individual output data may not be transmitted depending on the setting or timing. In other words, it is also practicable to transmit the individual output data corresponding to the login name "Jack" to the client terminal 10c with another timing than shown or not to transmit the individual output data in the entire period. It is also practicable not to always transmit individual output data to the other client terminals 10a and 10b. This configuration enables independent output control, such as not to display the figures based on individual output data on the client terminal 10c, not to update the figures, or to activate sound effects only on the client terminals 10a and 10b.

In the manner shown in FIG. 7, it is supposed that different pieces of individual output data for the different client terminals 10a, 10b, and 10c be generated and transmitted. For example, for the client terminal 10a, data specifying the type, position, and size of figures to be drawn on the client terminal 10a is generated as the individual output data dedicated to the user of the login name "Mom." The format of data is not especially restricted; in drawing a rectangle with its left upper vertex positioned at coordinates (20, 20) on the screen and the horizontal and vertical sizes being (300, 30), the data format is "Rectangle:{20, 20, 300, 30}" for example. Consequently, a rectangle like the rectangle 52a shown in FIG. 3 is drawn. It is also practicable to represent coordinates on the screen in a UV coordinate system or specify a color or a line width.

On the other hand, as described above, by associating the identification information of the client terminals 10a, 10b, and 10c with each piece of individual output data, the individual output data may be generated commonly to all client terminals so that each client terminal extracts the pieces of individual output data set thereto. FIG. 8 shows an example of a structure of the individual output data in this case. An individual output data table 70 includes an identification information column 72a and a figure data column 72b. The identification information column 72a indicates identification information transmitted from each client terminal 10, containing login names "Jack," "Mom," "Taro," "Doc," and so on in the figure. For these pieces of identification information, the figure data column 72b contains the information about figures to be drawn at each client terminal 10 in the format as described above.

Transmitting the individual output data table 70 described above to all client terminals 10 allows, in the client terminal 10a of the user having login name "Mom" for example, the individual output data processing block 20 to read the settings associated with own login name "Mom" in the figure data column 72b. It should be noted that, as described above, the shape, thickness, and color of figures, and the font and color in drawing characters may be stored in the individual output data information storage block 22 in advance and only identification numbers indicative thereof and drawing positions may be set in the figure data column 72b.

FIG. 9 illustrates another example of the structure of individual output data that is generated commonly to all client terminals 10. An individual output data table 74 includes an identification information column 76a and a sound effects ID column 76b, thereby setting identification numbers of sound effects as individual output data. The correlation between the data of sound effects to be actually generated, each piece of data, and identification numbers is stored in the individual output data information storage block 22 in advance by transmitting from the server 30 at starting a game. If invalid data is set to the sound effects ID column 76b (indicated by "–" in the figure), no sound effects are outputted.

The above-mentioned configuration outputs the sound effects indicated by "#06" to the client terminal of login name "Mom" and the sound effects indicated by "#02" to the client terminal of login name "Doc" with the output timing of image frame and sound transmitted as related by taking synchronization with the individual output data table 74. On the other hand, with this timing, no sound effects are generated at the client terminals having login names "Jack" and "Taro." The individual output data table 74 as described above is generated every time the necessity of generating sound effects at any client terminal 10 takes place and transmitted in association with image frames to be outputted at the same time.

This configuration allows the user to execute such control of the timing of generating sound effects and the type of sound for each client terminal as generating sound effects with a timing only corresponding only to the movement of an object operated by the user. It should be noted that, for sound effects, individual output data may be generated for each client terminal; in this case, only the identification number of sound effects may be transmitted to only the target client terminal with a proper timing. FIG. 8 and FIG. 9 each illustrate examples of individual output data in the case where one graphic or one piece of sound effects is outputted; it is also practicable to set two or more graphics or pieces of sound effects at the same time or combine graphic with sound effects.

Figure 10:
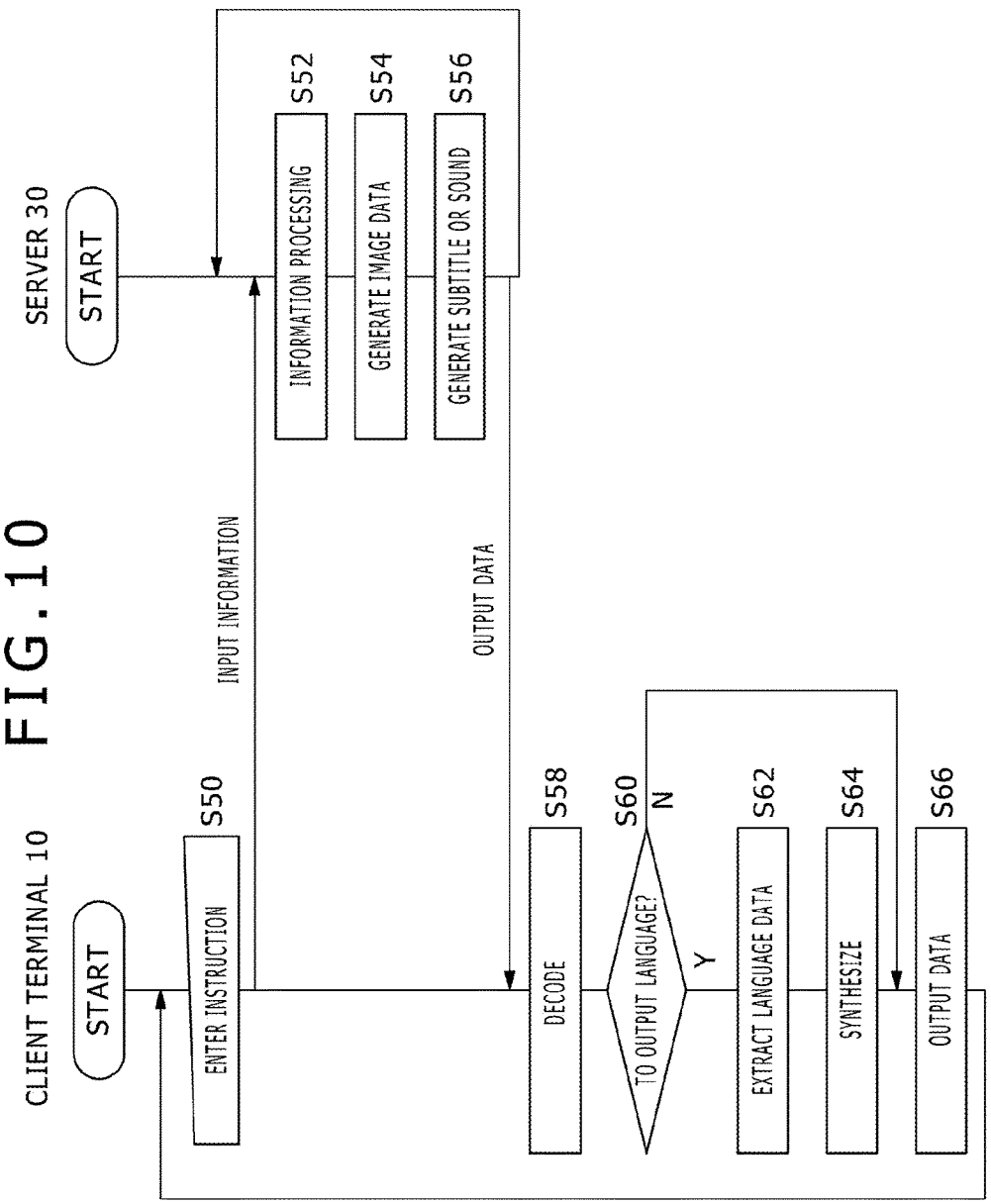
FIG. 10 is a flowchart indicative of a processing procedure of the client terminal and the server in realizing multilingualization of information processing in the present embodiment.

In the configuration described above, information processing can be multilingualized by use of multilanguage text data and multilanguage sound data as the individual output data. FIG. 10 illustrates a flowchart indicative of a processing procedure for the client terminal 10 and the server 30 for realizing the multilingualization of information processing in the present embodiment. The processing operations from a processing start request operation to outputting of initial data are the same as those shown in FIG. 6 and therefore the description of the processing operations will be skipped. However, for the identification information to be transmitted from the client terminal 10, the identification information on a language to be outputted is also transmitted to the server 30. Then, when the user enters an instruction in the input block 12 while watching the initial screen, the input information transmission block 14 transmits the input information to the server 30 every time an instruction is entered (S50).

When the input information reception block 32 of the server 30 receives the information, the information processing block 34 executes the corresponding information processing (S52). Next, the basic output data generation block 36 generates the data of an image that is a result of the information processing as basic output data (S54). The basic output data may further include such sound data other than languages as background music. On the other hand, the individual output data generation block 38 generates the data of at least one of subtitle and sound to be outputted in association with the information processing executed in S52 as individual output data in a language requested by each client terminal 10.

For example, the data of sound of a person appearing on the scene in a game is generated in two or more languages specified by two or more client terminals 10 in match with the progression of the game and associates the generated data with the identification information of each client terminal 10. The target data to be generated may be only subtitle, only sound, or both. It is also practicable to make the selection for each client terminal 10.

Next, the output data transmission block 42 appropriately integrates the basic output data generated in S54 with the individual output data of subtitle or sound generated in S56 by compressively encoding the data and transmits the integrated data to the client terminal 10. It should be noted that transmitting, a subtitle display position and font as basic output data at starting of a game in advance may make the individual output data only by text data. In outputting sound, the sound data itself may be transmitted depending on an output format or text data may be transmitted for sound synthesis on the side of each client terminal.

If the transmission of basic output data is executed by stream transfer of moving images, then, as with graphics and sound effects, the transmission is executed after taking synchronization between the individual output data and the basic output data in accordance with the timing to display subtitle and the timing to output the sound. Out of the transmitted output data, the output data reception block 16 of the client terminal 10 supplies the basic output data to the basic output data processing block 18 and the individual output data to the individual output data processing block 20. The basic output data processing block 18 decodes the image or sound data that is the basic output data and stores the decoded data into the buffer memory 24 (S58).

If setting for outputting subtitle or sound is made on the client terminal 10 (Y of S60), then the individual output data processing block 20 extracts, from the individual output data, the language data requested by the client terminal concerned and synthesizes the extracted language data with the image or sound of the game stored in the buffer memory (S62 and S64). It should be noted that this flowchart supposes that the server 30 integrates the pieces of data of all requested languages and transmits the integrated data to all client terminals 10, whereby each client terminal extracts the data of the language requested by the client terminal concerned. On the other hand, if only the data of a language requested by each client terminal 10 is transmitted, then the processing in S62 can be skipped.

If the user sets such that subtitle or sound is not output (N of S60), then the processing operations in S62 and S64 are skipped. Next, the output block 26 displays an image stored in the buffer memory 24 onto the display and output the sound from a speaker for example (S66). Repeating the processing operations in S50 through S66 appropriately updates the image and music of a game for example based on basic output data and the subtitle and sound based on individual output data, thereby realizing a mode in which information processing progresses.

FIG. 11 illustrates an example of the data exchanged between the client terminal 10 and the server 30 in the processing procedure shown in FIG. 10 and a display screen on each client terminal 10. As with FIG. 7, three users participate in the same game or watch the game, so that the client terminals 10a, 10b, and 10c are connected to the server 30. At starting of the game, the client terminals 10a and 10b request the server 30 for Japanese language and English language, respectively. In the figure, the request processing concerned is indicated by notations "Request for Japanese language" and "Request for English Language" and arrows. On the other hand, at the client terminal 10c, the user sets that language output is not required, so that no language request is made.

Then, the server 30 transmits the basic output data such as a game screen to the client terminals 10a, 10b, and 10c. In the example shown in FIG. 11, stream transfer of data of moving images is indicated by notation "Moving image stream" and arrows. In addition, the text data of subtitles in Japanese language and English language requested from the client terminals 10a and 10b is transmitted to all client terminals 10a, 10b, and 10c as individual output data. In the example shown in the figure, the transmission processing concerned is indicated by notation "Subtitle (English/Japanese)" and arrows.

Then, the client terminal 10a extracts the text data in Japanese language requested by the client terminal 10a and draws characters on the frame of a moving image that is the basic output data, thereby displaying the moving image attached with a subtitle in Japanese language as shown in the figure. Likewise, the client terminal 10b displays a moving image attached with a subtitle in English language. On the other hand, on the client terminal 10c, the extraction from individual output data and integration are not executed according to the user settings, so that no subtitle is displayed. It should be noted that subtitles may be displayed on a moving image as shown or in a display area separate from moving images as with the score 66a shown in FIG. 5. It should also be noted that the figure shows an example of subtitles, the same holding with sound.

It should be noted that whether or not to output subtitles and sound may be switchable halfway through the information processing. In addition, no individual output data may be transmitted to any client terminal that does not request for a language as with the client terminal 10c. As described above, generating subtitle or sound data only in a language actually requested by each client terminal can minimizes the processing by the server 30 in terms of language processing. For example, if all client terminals 10 request for the same language, then subtitle and sound data may only be generated and transmitted only in the requested language. If no client terminal 10 requests the output of languages, no individual output data need be generated.

As described above, the server 30 may integrate the basic output data with the individual output data thus generated and store the integrated data in the output data storage block 40. At this moment, the data obtained by attaching multilanguage subtitles and sound data to the basic output data may be integrated into one piece of data or a pair of basic output data and individual output data may be generated for each language to be stored. Then, in replay to a request from the client terminal 10 with a given timing, the output data including the data in the language specified by the requesting client terminal 10 is transmitted. Consequently, in the case of a game for example, each user can reproduce past plays for confirmation and watch plays of other users later.

In the case of the latter, regardless of a language requested by the client terminal 10 playing a game, speculatively generating, in advance, the subtitle or sound data in a predetermined language higher in frequency of use allows the user to enjoy watching games regardless of a language in use. In FIG. 6, an example in which graphics and sound effects are synthesized and, in FIG. 10, an example in which subtitles and sound are synthesized; it is also practicable to combine these pieces of data for synthesizing at the same time or any one or more of these pieces of data may be selectively synthesized.

According to the present embodiment described above, information related with a user operation at a client terminal is received by a server and output data as a result of the information processing executed accordingly on the side of the server is transmitted to the client terminal, thereby outputting image and sound corresponding to the user operation. At this moment, in addition to the basic output data of image and sound that is the main result of the information processing, the information related with figures, sound effects, subtitles, and sound that are unique to each destination client terminal is generated and transmitted as individual output data. Then, the client terminal synthesizes and outputs these pieces of data.

Consequently, in the case where the same information processing results are shared by two or more client terminals as basic output data, the images and sound can be outputted in a state customized for each client terminal. In addition, in the case of a game in which two or more users participate, an object of attention can easily be distinguished from others. Therefore, the requests by each user can be satisfied in the viewpoint of ease of watching and ease of operation, while making the most of the advantages such as the mitigation of processing load of each client terminal and the occurrence of communication by participation of two or more users that are caused by integrating user-desired information processing operations on the server.

Generally, if the data transmission from the server is stream transfer of moving image and sound, then it is difficult to separately generate figures and sound effects linked to these data on the client terminal side. In the case of a game in which image data and sound data are generated realtime with each user operation, it is difficult to generate, in advance, the data to be attached. In the present embodiment, basic output data and individual output data are collectively generated on the side of the server and generated data is transmitted, so that even the data generated realtime can easily be synchronized. Also, simplifying individual output data allows similar output independently of the processing performance of each client terminal.

Further, holding basic output data and individual output data on the side of the server as one piece of output data allows the output in a form corresponding to each user request within a range of the data generated as individual output data also after the completion of information processing. Still further, synthesizing is executed by use of individual output data at the stage of output at each client terminal, so that display and non-display of figures and subtitles and output and non-output of sound effects and sound can easily be switched in accordance with user preference or situation. As a result, output forms can be changed as occasion may demand for user requests.

While preferred embodiments of the present invention have been described using specific terms, such description is for illustrative purpose only, and it is to be understood by those skilled in the art that changes and variations of combination of configurations and processing operations may be made without departing from the spirit or scope of the following claims.

REFERENCE SIGNS LIST

1 . . . Information processing system, 10 . . . Client terminal, 12 . . . Input block, 14 . . . Input information transmission block, 16 . . . Output data reception block, 18 . . . Basic output data processing block, 20 . . . Individual output data processing block, 22 . . . Individual output data information storage block, 24 . . . Buffer memory, 26 . . . Output block, 30 . . . Server, 32 . . . Input information reception block, 34 . . . Information processing block, 36 . . . Basic output data generation block, 38 . . . Individual output data generation block, 40 . . . Output data storage block, 42 . . . Output data transmission block

INDUSTRIAL APPLICABILITY

As described above, the present invention is applicable to information processing apparatuses such as a computer, an information terminal and a game machine, a server configured to provide various services for these apparatuses, and an information processing system such as cloud computing.

The invention claimed is:

1. An output data providing server connected to a plurality of client terminals through a network, the output data providing server comprising:
   an input information reception block configured to obtain respective input information from each of the plurality of client terminals, each respective input information including respective user operation commands and respective user preference commands from each of the plurality of client terminals;
   an information processing block configured to execute an application program on a basis of the respective input information;
   a basic output data generation block configured to generate basic output data from the execution of the application program on a basis of all of the respective user operation commands from the plurality of client terminals collectively, where the basic output data includes streaming output data of the application program;
   an individual output data generation block configured to generate respective individual output data from the execution of the application program on a basis of the respective user preference commands from the plurality of client terminals individually, where the individual output data includes streaming output data of the application program; and
   an output data transmission block configured to transmit the basic output data and the respective individual output data to each of the plurality of client terminals after associating the basic output data with the respective individual output data, wherein the transmission of the basic output data and the respective individual output data results in real-time streaming of the streaming output data of the application program from the server to the plurality of client terminals through the network.

2. The output data providing server according to claim 1, wherein
the basic output data generation block sequentially generates the basic output data in accordance with the respective input information, and
the individual output data generation block generates the individual output data with a necessary timing in parallel to the generation of the basic output data in the basic output data generation block.

3. The output data providing server according to claim 1, wherein the output data transmission block stream-transfers the basic output data to one or more of the client terminals in a sequence in which the basic output data was generated and transmits the respective individual output data for the one or more of the client terminals in synchronization with data in the basic output data with which the respective individual output data is to be synthesized and then outputted.

4. The output data providing server according to claim 1, wherein
the basic output data generation block generates data of a moving image as a result of the information processing, and
in the moving image, the individual output data generation block generates data for drawing a figure to be attached to an object corresponding to each destination client terminal.

5. The output data providing server according to claim 1, wherein
the basic output data generation block generates data of a moving image as a result of the execution of the application program, and
in the moving image, the individual output data generation block generates data for outputting a sound effect to be generated in correspondence with an object corresponding to each of the plurality of client terminals.

6. The output data providing server according to claim 1, wherein
the basic output data generation block generates data of a moving image as a result of the execution of the application program, and
the individual output data generation block generates, in a language requested by each client terminal, data of at least one of a subtitle and a sound to be outputted in correspondence with the moving image.

7. The output data providing server according to claim 1, wherein
the individual output data generation block generates the respective individual output data for each of the plurality of client terminals, and
the output data transmission block transmits, for each client terminal, respective individual output data corresponding to each such client terminal and the basic output data after associating the respective individual output data with the basic output data.

8. The output data providing server according to claim 1, wherein
the individual output data generation block generates a table indicative of correlation between identification information for the plurality of client terminals and the respective individual output data of each client terminal, and the output data transmission block transmits the table generated by the individual output data generation block and the basic output data to the plurality of client terminals after associating the table with the basic output data.

9. The output data providing server according to claim 1, further comprising
an output data storage block configured to store the basic output data and the respective individual output data after associating the basic output data with the respective individual output data,
wherein the output data transmission block successively transmits output data once stored in the output data storage block upon request from any of the plurality of client terminals.

10. An information processing apparatus, acting as a client terminal among a plurality of client terminals, connected to a server through a network, the information processing apparatus comprising:
a receiving block configured to receive basic output data and respective individual output data from the server, where the basic output data includes streaming output data of the application program, and where the individual output data includes streaming output data of the application program;
a basic output data processing block configured to extract the basic output data;
an individual output data processing block configured to extract the respective individual output data and to synthesize the respective individual output data with the basic output data in accordance with a necessary timing, thereby providing final output data; and
an output block configured to output the final output data, wherein
the server receives respective input information from each of the plurality of client terminals over the network, each respective input information including respective user operation commands and respective user preference commands from each of the plurality of client terminals;
the server executes the application program on a basis of the respective input information;
the server generates the basic output data from the execution of the application program on a basis of all of the respective user operation commands from the plurality of client terminals collectively;
the server generates the respective individual output data from the execution of the application program on a basis of the respective user preference commands from the plurality of client terminals individually; and
the server transmits the basic output data and the respective individual output data to each of the plurality of client terminals after associating the basic output data with the respective individual output data, wherein the transmission of the basic output data and the respective individual output data results in real-time streaming of the streaming output data of the application program from the server to the plurality of client terminals through the network.

11. The information processing apparatus according to claim 10, wherein,
the server successively generates the basic output data on a basis of the input information, and
the individual output data processing block synthesizes the basic output data transmitted from the server in synchronization with the respective individual output data.

12. The information processing apparatus according to claim 10, wherein the individual output data processing block stops the synthesis of the respective individual output data in accordance with user settings.

13. The information processing apparatus according to claim 10, further comprising
an input information transmission block configured to specify a language of use for the server, wherein
the basic output data is data of a moving image successively generated in the server, and
the individual output data processing block synthesizes with the moving image at least one of a subtitle and a sound transmitted along with the data of the moving image as the respective individual output data and represented in the language of use.

14. An output data providing method in which a server is connected with a plurality of client terminals through a network, the output data providing method comprising:
obtaining respective input information from each of the plurality of client terminals, each respective input information including respective user operation commands and respective user preference commands from each of the plurality of client terminals;
executing an application program on a basis of the respective input information;
generating basic output data from the execution of the application program on a basis of all of the respective user operation commands from the plurality of client terminals collectively, where the basic output data includes streaming output data of the application program;
generating respective individual output data from the execution of the application program on a basis of the respective user preference commands from the plurality of client terminals individually, where the individual output data includes streaming output data of the application program; and
transmitting the basic output data and the respective individual output data to each of the plurality of client terminals after associating the basic output data with the respective individual output data, wherein the transmission of the basic output data and the respective individual output data results in real-time streaming of the streaming output data of the application program from the server to the plurality of client terminals through the network.

* * * * *